2,940,949

COMPOSITION CONTAINING POLYPROPYLENE AND AN ESTER PLASTICIZER

Daniel R. Mullin, Chester, Pa., assignor to Sun Oil Company, Philadelphia, Pa., a corporation of New Jersey No Drawing. Filed Aug. 26, 1957, Ser. No. 680,404

9 Claims. (Cl. 260—31.4)

This invention relates to new compositions of matter and methods for their preparation. More particularly, the present invention relates to solid polymers of propylene compounded with certain additives to give new compositions of enhanced properties.

Low molecular weight olefins such as propylene have heretofore been polymerized to relatively low molecular weight liquids or soft amorphous solids through the use of polymerization catalysts such as aluminum trichloride, boron trifluoride and the like. Such olefins can be polymerized to relatively high molecular weight solid polymers by contacting the olefin with a dispersion of titanium trichloride and an activator such as aluminum triethyl maintained in an inert, liquid reaction medium. Generally such processes produce polymers of propylene having molecular weights of above about 25,000 and usually within the range of from about 50,000 to 250,000. A proportion of the solid products obtained with propylene using the mentioned catalyst appears crystalline, i.e., exhibits a crystalline structure by X-ray analysis. The crystalline polymer is relatively insoluble in the usual hydrocarbon solvents, such as the paraffins including for example, the pentanes, hexanes, octanes, decanes, and the like, even at elevated temperatures. However, the crystalline polymer can be dissolved in such solvents at relatively high temperatures, as hereinafter described. This insolubility provides a means of separating crystalline polymers from amorphous polymers of propylene which are also formed in the process, since the amorphous polymers are quite soluble in such hydrocarbons. Although the crystalline polymers of propylene, hereinafter for convenience designated "polypropylene," possess many desirable properties, they are not suitable for use in many applications because of their high brittle points. By "brittle point" is meant the temperature at which the polymer exhibits brittle failure under specific impact conditions as measured by ASTM test (D746–55T). For example, thin films or fibers of polypropylene are not suitable for use in applications where flexibility is required, such as for use as wrapping materials, because of cracking at temperatures encountered under usual room temperatures, or slightly below usual room temperatures. Likewise, polypropylene is not suitable for preparing fluid containers, fluid conduits, or like articles for the same reason.

Many plasticizers heretofore used with various plastic materials do not appear suitable for improving the brittle point of polypropylene because such materials lower the tensile strength and/or adversely affect other physical properties of the polymer, such as the melting point, melt index, and the like.

An object of the present invention is to provide a polypropylene composition having a low brittle point. Another object is to provide a new composition of matter having a low brittle point comprising a relatively high molecular weight polypropylene admixed with a minor quantity of a diester additive. A further object is to provide a process for preparing polypropylene compositions having low brittle points. Other objects and their achievement in accordance with the invention will be apparent hereinafter.

It has now been found that solid polymers of propylene having improved properties can be prepared by compounding polypropylene with a minor quantity of diesters of adipic acid or diesters of polyethylene glycols.

The crystalline polypropylene used in the process of the invention is prepared by polymerizing propylene with a solid catalyst maintained as a dispersion in an inert, liquid diluent, such as n-heptane or isooctane. The solid catalyst is preferably a halide of a metal such as zirconium, chromium, vanadium, molybdenum or titanium wherein the metal is in a valence state other than its highest valence state. A lower halide of titanium such as titanium trichloride or titanium dichloride, or a mixture thereof, is preferred. The metal halide is used with an activator therefor such as an aluminum alkyl. For example, aluminum triethyl, aluminum triisopropyl, aluminum tri-n-propyl, or aluminum triisobutyl are suitable activators and give good results. Generally a mole ratio of activator to metal halide of 1:1 to 12:1 is used. Temperatures of from about 0° C. to 170° C. are suitable. Atmospheric pressure can be used although elevated pressures are preferred in that the polymerization reaction proceeds at a faster rate at such elevated pressures, say up to about 10,000 p.s.i.g. (pounds per square inch gauge). Polypropylene is recovered from the reaction system by draining the inert, liquid reaction medium and the catalyst is deactivated and removed by contacting the polypropylene with water, alcohol or an aqueous or alcoholic solution of an inorganic acid, such as nitric acid, with vigorous agitation. Preferably such agitation provides for comminuting the polymer during the contacting with the catalyst deactivating liquid to insure good catalyst deactivation. The polymer is then repeatedly washed to remove at least a major proportion of the residual inorganic material from the catalyst, and is then dried. The described procedure yields a product which is a mixture of a predominate amount of crystalline polypropylene with a minor amount of amorphous polypropylene. The amorphous polymer can be removed by dissolution in a hydrocarbon solvent at an elevated temperature below the temperature at which the crystalline polymer is dissolved. For example, dissolution of the amorphous polymer in n-pentane at the boiling point of n-pentane (under atmospheric pressure), or n-heptane, isooctane, tetrahydronaphthalene, decahydronaphthalene, or the like gives good results. The resulting crystalline polypropylene is then used in the process of the invention. However, a quantity of the amorphous polymer, by which is meant the polymer which is soluble in n-pentane at the boiling point of n-pentane under atmospheric pressure, say up to about 10% by weight, can be present with the crystalline polymer and good results obtained. The crystalline polypropylene will generally have a molecular weight of from about 25,000 to 300,000 and usually from about 50,000 to 250,000, a melting point of from about 161° C. to 171° C., and exhibits a crystalline structure by X-ray analysis. The polypropylene may be combined with a small quantity of oxygen, such as from oxidation by contacting air, and good results obtained, even though such oxidation increases the brittle point of the polymer. Generally the quantity of oxygen is below about 0.1%. In order to prevent excessive oxidation, it is advantageous to incorporate an oxidation inhibitor in the polymer shortly after or during the preparation. The presence of the inhibitor, in the quantities required to substantially completely prevent oxidation, does not adversely affect the compositions of the present invention.

The additives of the present invention are diesters selected from the group consisting of alkyl decyl adipates wherein the alkyl group has from 6 to 12 carbon atoms, and diesters of polyethylene glycols wherein each acid portion of the diester has from 6 to 12 carbon atoms.

The alkyl decyl adipates of the invention are those which have the type formula $ROOC(CH_2)_4COOC_{10}H_{21}$, wherein R may be any alkyl having from 6 to 12 carbon atoms. Examples of compounds of this type which will produce good results are di-isodecyl adipate, isodecyl-n-octyl adipate, n-octyl-n-decyl adipate, n-dodecyl-n-decyl adipate, isohexyl-isodecyl adipate, and the isomers and homologues thereof within the above limits. The diesters of polyethylene glycols which may be used are those which have the type formula

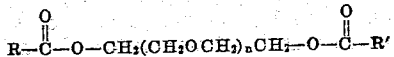

wherein R and R' are alkyl radicals having from 5 to 11 carbon atoms; i.e., the acid portions of the diester have from 6 to 12 carbon atoms, and $n$ is an integer greater than 1. Preferably the molecular weight of the diesters of polyethylene glycol is such that the boiling point at 5 mm. Hg pressure is not greater than about 290° C.

In order to prepare the compositions of the present invention, it is essential that the additive come within the above-defined groups. Similar compounds not within the above definitions do not give operable results. For example, diethyl hexyl adipate and di-isohexyl adipate are not suitable for use as above described.

From about 7% to 25% by weight of the subject additive can be incorporated in polypropylene. When less than the stated amount is used, the brittle point is not significantly affected, whereas large quantities adversely affect other properties such as the melt index. The compositions are prepared by heating the polypropylene to a temperature above its melting point, dissolving the additive therein, mixing and cooling the resulting composition. If an oxidation inhibitor has not been incorporated into the polypropylene, the composition is advantageously prepared under an inert atmosphere, such as an atmosphere of nitrogen, to prevent oxidation of the polypropylene.

The following examples illustrate compositions of the invention and their preparation. In the examples, "parts" refers to parts by weight. The polypropylene had a molecular weight of about 150,000, a brittle point of 4° C. to 16° C., a melt index of about 0.1 and a melting point of about 165° C. Prior to incorporating the additives, about 0.2% by weight of an oxidation inhibitor, 4,4'-thio-bis(6-tertiary-butyl-m-cresol), was incorporated into the polypropylene. The "brittle point" as stated in the examples was determined by ASTM method D746-55T. Compositions having a brittle point of about −4° C. are considered to fail in the test. By "melt index," as used herein, is meant the weight of polymer expressed in grams extruded through an orifice 0.0823 inch in diameter from a barrel 0.3760 inch in diameter under the force of a piston weighing 2160 grams, the polymer being maintained at 190° C. during the extrusion.

Example 1

10% by weight di-isodecyl adipate was incorporated into the above polypropylene. The resulting composition had a brittle point of −18° C., a melt index of 0.505, and a melting point of 185° C.

Example 2

10% by weight of isodecyl octyl adipate was combined with the same inhibited polypropylene, resulting in a composition having a brittle point of −20° C., a melt index of 0.42, and a melting point of 169° C.

Example 3

10% by weight of di-ethyl hexyl adipate was added to the same inhibited polypropylene. The resulting composition failed the brittle test, having a brittle point of above 4° C.

Example 4

A composition was prepared using the polypropylene described above and 10% by weight of triethylene glycol di(2-ethyl hexoate). The brittle point was lowered to −7° C., the melt index was raised to .297 and the melting point was raised to 184° C.

Example 5

A similar polypropylene sample was combined with a polyethylene glycol di(2-ethyl hexoate) having a boiling point at 5 mm. Hg of 255° C. The resulting composition had a brittle point of −7° C., a melt index of .289, and the melting point was raised to 197° C.

Many materials which have heretofore been described as suitable for plasticizing polymers of other materials are not suitable for plasticizing polypropylene. Thus, for example, compositions of polypropylene with di-isohexyl adipate, phenyl ethylene oxide, benzoyl acetate, di-octyl phthalate and tricresyl phosphate were prepared. With some of these additives, namely di-octyl phthalate, and tricresyl phosphate, the resulting compositions not only failed in the brittle test, but were brittle at room temperature. Furthermore, such additives caused decomposition of the polymer composition. None of these materials gave a composition which passed the brittle point test.

The invention claimed is:

1. A new composition of matter comprising polypropylene and a material selected from the group consisting of an alkyl decyl adipate wherein the alkyl group has from 6 to 12 carbon atoms and a diester of polyethylene glycol having the type formula

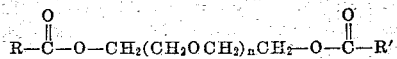

wherein R and R' are alkyl radicals having from 5 to 11 carbon atoms and $n$ is an integer greater than 1, and having a boiling point at 5 mm. Hg of not greater than 290° C.

2. A new composition of matter as defined by claim 1 wherein the material selected is from about 7% to 25% by weight of the composition.

3. A new composition of matter as defined by claim 2 wherein the material selected is di-isodecyl adipate.

4. A new composition of matter as defined by claim 2 wherein the material selected is isodecyl-n-octyl adipate.

5. A new composition of matter as defined by claim 2 wherein the material selected is n-octyl-n-decyl adipate.

6. A new composition of matter as defined by claim 2 wherein the material selected is triethylene glycol di(2-ethyl hexoate).

7. A new composition of matter as defined by claim 2 wherein the material selected is polyethylene glycol di(2-ethyl hexoate) having a molecular weight such that its boiling point at 5 mm. Hg is from 215° C. to 290° C.

8. A new composition of matter consisting essentially of predominantly crystalline polypropylene, an oxidation inhibitor, and a material selected from the group consisting of an alkyl decyl adipate wherein the alkyl group has from 6 to 12 carbon atoms, and a diester of polyethylene glycol having the type formula

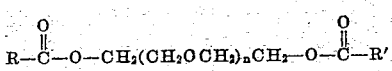

wherein R and R' are alkyl radicals having from 5 to 11 carbon atoms and $n$ is an integer greater than 1, and having a boiling point at 5 mm. Hg of not greater than 290° C.

9. A new composition of matter as defined by claim 8 wherein the oxidation inhibitor is 4,4'-thio-bis(6-tertiary-butyl-m-cresol).

References Cited in the file of this patent
UNITED STATES PATENTS

| | | |
|---|---|---|
| 2,244,021 | Rosen et al. | June 3, 1941 |
| 2,274,672 | Dennison | Mar. 3, 1942 |
| 2,670,382 | Downey et al. | Feb. 23, 1954 |

OTHER REFERENCES

Buttrey: "Plasticizers," Cleaver-Hume Press Ltd., New York, 1950, page 50.

Natta: Journal of Polymer Science, volume XVI, pages 143–154, 1955.